(12) United States Patent
Rising, III et al.

(10) Patent No.: US 6,898,607 B2
(45) Date of Patent: May 24, 2005

(54) PROPOSED SYNTAX FOR A SYNCHRONIZED COMMANDS EXECUTION

(75) Inventors: Hawley K. Rising, III, San Jose, CA (US); Ali Tabatabai, Beaverton, OR (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 448 days.

(21) Appl. No.: 09/904,176

(22) Filed: Jul. 11, 2001

(65) Prior Publication Data

US 2002/0095438 A1 Jul. 18, 2002

Related U.S. Application Data

(60) Provisional application No. 60/217,787, filed on Jul. 11, 2000.

(51) Int. Cl.$^7$ ................................................ G06F 17/00
(52) U.S. Cl. .................................................... 707/104.1
(58) Field of Search ............................... 707/100, 102, 707/104.1, 101, 1–5

(56) References Cited

U.S. PATENT DOCUMENTS 5,826,252 A  * 10/1998  Wolters et al. ................. 707/1
6,581,039 B2 * 6/2003 Marpe et al. ................... 705/7
2002/0085028 A1 * 7/2002 Tabatabai et al. ........... 345/748
2003/0212992 A1 * 11/2003 Ronning et al. ............. 717/178

* cited by examiner

*Primary Examiner*—Alford Kindred
*Assistant Examiner*—Sana Al-Hashemi
(74) *Attorney, Agent, or Firm*—Blakely, Sokoloff, Taylor & Zafman LLP

(57) ABSTRACT

A system and method for allowing synchronized execution of a set of commands is provided. A first system contains a content description tree that may be dynamically updated by a set of commands from a second system. In the set of commands, commands may be executed in parallel or in sequence. If the group of commands are tagged to be executed in parallel, parallel execution of commands implies that there are no dependencies between the execution of the commands. As the result, the decoder will have more flexibility to schedule the execution of these commands. If the group of commands are tagged to be executed sequentially, then the order of execution matters. Therefore, in order to synchronize the execution of the group of commands in a set, a parallel or sequential tag is included identifying whether this group of commands should be executed in parallel or in sequence.

44 Claims, 4 Drawing Sheets

```
1  <complexType name="Command Script">
2    <element name="command" type="commandDS" minOccurs="1"
3            maxOccurs="unbounded"/>
4    <element name="script" type="CommandScript" minOccurs="0"
5            maxOccurs="unbounded"/>
6    <attribute name= "executionOrder">
7      <simpleType base="string">
8        <enumeration value="sequential"/>
9        <enumeration value="parallel"/>
10     </simpleType>
11   </attribute>
12   <attribute name="authority" type="authorityLevel" use="required"/>
13   <attribute name="writeXML" type="boolean" use="default" value="false"/>
14   <attribute name="resultXML" type="uriReference" use="optional"/>
15   <attribute name="writeXSD" type="boolean" use="default" value="false"/>
16   <attribute name="resultXSD" type="uriReference" use="optional"/>
17 </complexType>
```

```
<complexType name="SyncCommandDS" base="Command" derivedBy="extension">
   <attribute name="start_time" type="time"/>
```

```
1  <complexType name="Command Script">
2     <element name="command" type="commandDS" minOccurs="1"
3             maxOccurs="unbounded"/>
4     <element name="script" type="CommandScript" minOccurs="0"
5             maxOccurs="unbounded"/>
6     <attribute name= "executionOrder">
7       <simpleType base="string">
8         <enumeration value="sequential"/>
9         <enumeration value="parallel"/>
10      </simpleType>
11   </attribute>
12   <attribute name="authority" type="authorityLevel" use="required"/>
13   <attribute name="writeXML" type="boolean" use="default" value="false"/>
14   <attribute name="resultXML" type="uriReference" use="optional"/>
15   <attribute name="writeXSD" type="boolean" use="default" value="false"/>
16   <attribute name="resultXSD" type="uriReference" use="optional"/>
17 </complexType>

<complexType name="SyncCommandDS" base="Command" derivedBy="extension">
     <attribute name="start_time" type="time"/>
```

Fig. 2

```
1  <complexType name="commandDS">
2     <element name="value" type="nodeValue" minOccurs="0" maxOccurs="1"/>
3     <element name="nextCommand" type="commandDS" minOccurs="0"
4              maxOccurs="unbounded"/>
5     <attribute name="sourceXML" type="uriReference" use="optional"/>
6     <attribute name="sourceXSD" type="uriReference" use="optional"/>
7     <attribute name="select" type="uriReference" use=required"/>
8     <attribute name="type" type="commandType" use="required"/>
9     <attribute name="insert" type=insertPosition" use="default" value="after"/>
10 </complexType>
11
12 <complexType name="SyncCommandDS" base="Command" derivedBy="extension">
13    <attribute name="start_time" type="time"/>
```

Fig. 3

PROPOSED SYNTAX FOR A SYNCHRONIZED COMMANDS EXECUTION

CLAIM OF PRIORITY

This application claims priority from co-pending U.S. Provisional Patent Application No. 60/217,787 filed Jul. 11, 2000 entitled PROPOSED SYNTAX FOR A SYNCHRONIZED COMMANDS EXECUTION which is hereby incorporated by reference, as is set forth in full in this document, for all purposes.

RELATED APPLICATIONS

This application is related to non-provisional application "Command Description Scheme Providing For Dynamic Update of Instance Documents and Their Associated Schema", Ser. No. 09/865,030, filed May 24, 2001, which is hereby incorporated by reference for all purposes.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to the field of audio/visual content. More specifically, one embodiment of the invention provides a system for synchronizing command execution.

The amount of multimedia content available on the World Wide Web and in numerous other databases is growing out of control. However, the enthusiasm for developing multimedia content has led to increasing difficulties in managing, accessing, and identifying the content mostly due to their volume. To address this problem, MPEG-7 is being developed by the Moving Pictures Expert Group (MPEG), which is a working group of ISO/IEC. In contrast to preceding MPEG standards such as MPEG-1 and MPEG-2, which relate to coded representation of audio-visual content, MPEG-7 is directed to representing information relating to content, and not the content itself.

The MPEG-7 standard, formally called the "Multimedia Content Description Interface" seeks to provide a rich set of standardized tools for describing multimedia content. The objective is to provide a single standard for providing interoperable, simple, and flexible solutions to the aforementioned problems vis-à-vis indexing, searching, and retrieving multimedia content. It is anticipated that software and hardware systems for efficiently generating and interpreting MPEG-7 descriptions will be developed.

More specifically, MPEG-7 defines and standardizes the following: (1) a core set of Descriptors (Ds) for describing the various features of multimedia content; (2) Description Schemes (DSs) which are pre-defined structures of Descriptors and their relationships; and (3) a Description Definition Language (DDL) for defining Description Schemes and Descriptors.

A Descriptor (D) defines both the semantics and the syntax for representing a particular feature of audiovisual content. A feature is a distinctive characteristic of the data which is of significance to a user.

As noted, DSs are pre-defined structures of Descriptors and their relationships. Specifically, the DS sets forth the structure and semantics of the relationships between its components having either Descriptors and/or Description Schemes. To describe audiovisual content, a concept known as syntactic structure which specifies the physical and logical structure of audiovisual content is utilized.

The Description Definition Language (DDL) is the language that allows the creation of new Description Schemes and Descriptors. It also allows the extension and modification of existing Description Schemes. The DDL has to be able to express spatial, temporal, structural, and conceptual relationships between the elements of a DS, and between DSs.

In an MPEG-7 environment, a client describes content in terms of XML/DDL-based MPEG-7 instant documents. In general, these instant documents are represented by a tree where nodes represent different Ds and DSs. Two elements created by DDL, called "Command DS" and "CommandScript" with their associated syntax (schema), allow the dynamic update of these DDL-based MPEG-7 instant documents. CommandDS allows a server, for example, to dynamically update the structure of client instant document by issuing update commands such as "add", "delete", and "change".

More specifically, CommandDS provides a means to perform a set of operations on the nodes of a content description tree. The operations include adding a node before or after a specified node, changing the node to a new node, changing the node's value, and deleting the node.

SUMMARY OF THE INVENTION

A system and method for allowing synchronized execution of a set of commands is provided by virtue of this invention. In one embodiment, a first system (e.g., decoder) contains a content description tree that may be dynamically updated by a set of commands from a second system (e.g., encoder). In the set of commands, commands may be executed in parallel or in sequence. If the group of commands are tagged to be executed in parallel, parallel execution of commands implies that there are no dependencies between the execution of the commands, i.e., commands are executed in any order. As the result, the decoder will have more flexibility to schedule the execution of these commands. If the group of commands are tagged to be executed sequentially, then the order of execution matters. Thus, execution of one command depends on the execution of a prior command. Therefore, in order to synchronize the execution of the group of commands in a set, a parallel or sequential tag is included identifying whether this group of commands should be executed in parallel or in sequence.

In one embodiment, for synchronization purposes, it becomes necessary to indicate a time when a command (or a group of commands) is to be executed and a time window of validity (expressed in terms of duration). This time-related information is included by using start time and/or a duration time attributes. The start time would indicate the starting time for executing a command (or a group of commands) and the duration time would indicate a time window of execution (i.e., a command can be executed at any point within this time window). Thus, if a command cannot be executed at the start time, a time window given by the duration time will provide the flexibility to execute the command within the time window.

In another embodiment, an authority level attribute may be included. The authority level attribute indicates an authority level to execute a command. This attribute provides a means to control execution of commands. For example, when receiving commands, the decoder may skip executing commands from a low level authority or may execute commands with a high level of authority.

In another embodiment, write and result attributes may be included. Two result attributes (one for schema and one for instant document) signal whether the results of changes due to the update commands should be stored in a separate file or reflected back in the original schema and/or instant documents. Two write attributes specify the location where to save the results of schema and/or instant document updates.

In one embodiment, a method for executing a group of commands on a content description structure, the content description structure including a plurality of nodes relationally related, in a computing environment is provided. The method comprises the steps of: determining a dependency between commands in the group of commands based on the relationally related plurality of nodes; assigning one or more attribute tags to the group of commands, wherein assigning one or more attribute tags comprises if commands in the group of commands are determined to be dependent, assigning a sequential tag to the group of commands and if commands in the group of commands are determined to be independent, assigning a parallel tag to the group of commands; and executing the group of commands according to the one or more attribute tags, wherein executing the group of commands comprises if the group of commands was assigned a sequential tag, executing commands in the group of commands in sequence and if the group of commands was assigned a parallel tag, executing commands in the group of commands in parallel.

In another embodiment, a schema for synchronizing an execution of a group of commands in a MPEG computing environment is provided. The schema comprises: an execution order attribute, wherein the execution order attribute comprises a sequential tag that indicates commands in the group of commands are to be executed in sequence and a parallel tag that indicates commands in the group of commands are to be executed in parallel; an authority level attribute that indicates a priority level for the execution of the group of commands; a result attribute, wherein the result attribute comprises a new file value that indicates a new file is to be created for a result of the execution of the group of commands and an overwrite value that indicates the result for the execution of the group of commands is to be overwritten over an existing file; and a write attribute that indicates where the new file result of the execution of the groups of commands is stored.

A further understanding of the major advantages of the invention herein may be realized by reference to the remaining portions of the specification and the attached drawings.

BRIEF DESCRIPTION OF THE DRAWINGS

FIG. 2 is an example of a syntax of a CommandScript DS according to one embodiment.

FIG. 3 is an example of a syntax for SyncCommandDS according to one embodiment.

DESCRIPTION OF THE SPECIFIC EMBODIMENTS

Figure 1:
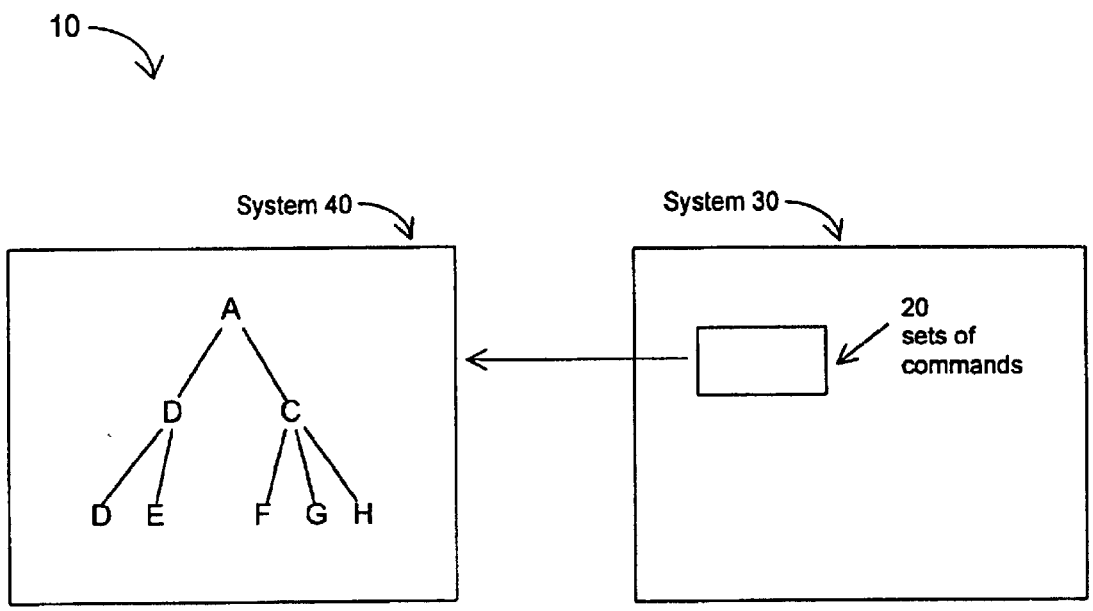
FIG. 1 is a block diagram of a system for synchronizing command execution according to one embodiment.
Figure 4:
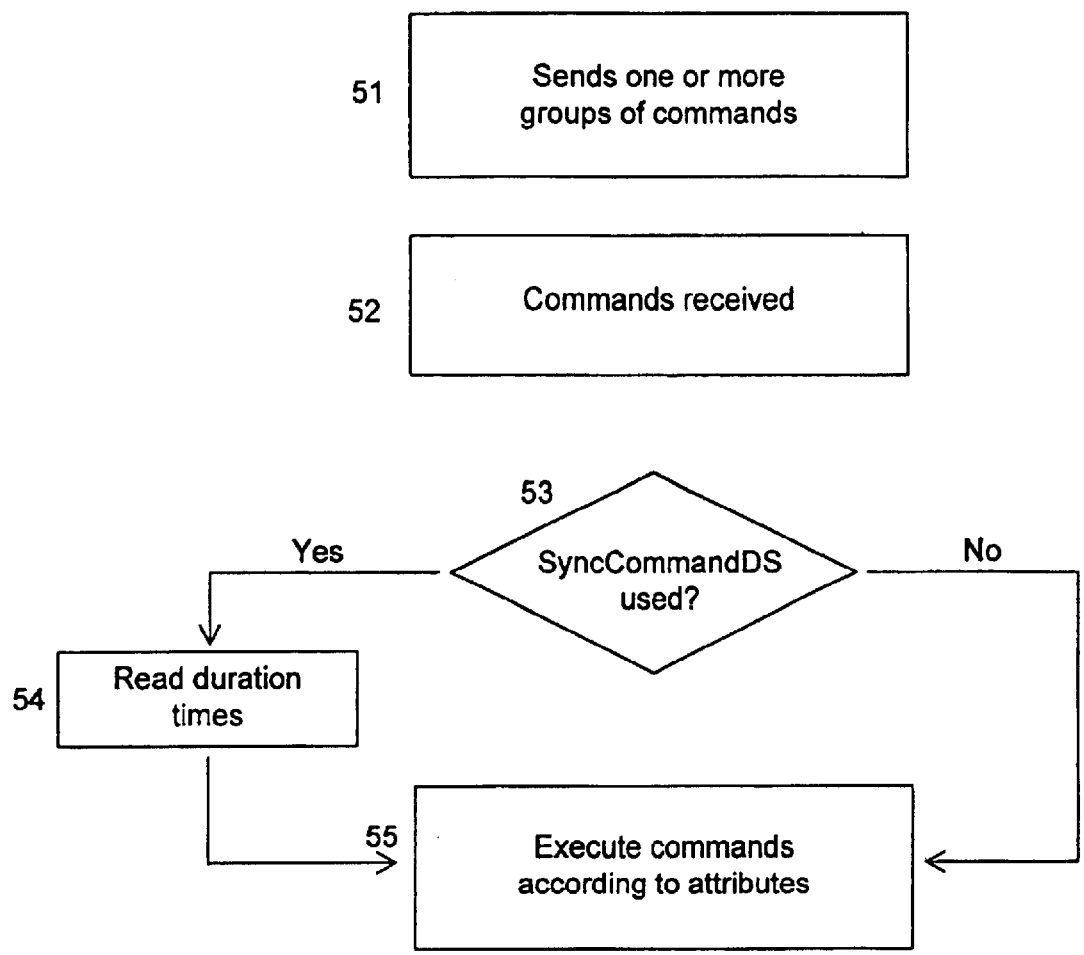
FIG. 4 illustrates a method for synchronizing command execution according to one embodiment.

FIG. 1 shows a system 10 that is used to synchronize the execution of commands. System 10 includes a system 30 and a system 40. A set of commands 20 is sent from system 30 to system 40, where the commands are executed on a description content structure 50. While only two systems and one content structure are shown, it will be understood that there may be multiple systems communicating and multiple content descriptions. Additionally, in one embodiment, the set of commands 20 are MPEG-7 commands. Although the following description may refer to MPEG-7, it will be understood that other MPEG descriptions may be used in addition to other computing languages.

System 30 includes content structure 50 and may be any computing device capable of storing content structure 50. In a specific embodiment, system 30 may be a client running on a computing device such as a personal computer, workstation, or server. Additionally, system 30 includes logic to decode a set of commands.

Content description structure 50 may be any XML/DDL based description containing an instance of content description. Additionally, the description structure 50 may describe a schema. A schema is a template or structure for an instance. An instance includes values corresponding to the schema. In a specific embodiment, description content structure 50 may be a DDL-based MPEG-7 content description document. As shown in FIG. 1, content description structure 50 is represented by a tree structure with nodes A, B, C, etc. The nodes are considered the instance of content description. The relation between the nodes is specified by the schema.

System 40 may be any computing device capable of communicating with system 30. In a specific embodiment, system 40 may be a server, personal computer, or workstation. In a typical communication, system 30 includes logic to encode a set of commands 20 and send the commands 20 to system 40.

The set of commands 20 may be organized into a group of commands where each group of commands may contain one or more commands. In one embodiment, CommandDS of MPEG-7 is used for performing an update. It specifies 1) the node where the update should take place; 2) the nature of update command (add, delete or change), and 3) the update value when using add or change commands.

In one embodiment, CommandScriptDS of MPEG-7 is used for grouping of "CommandDSs" according to their execution order. In addition, there may be a need, for synchronization purposes, to specify the execution time for each group of commands. SyncCommandDS is an extension of "CommandDS" that includes two timing related attributes namely "start_time" and an optional "duration_time". The "start_time" attribute is used to specify the execution time of a group of commands. The optional "duration_time" attribute gives flexibility to the decoder to execute a group of commands within the time window specified by start_ time and start_time +duration_time.

A schema for CommandScriptDS according to one embodiment is shown in FIG. 2. As mentioned above and found on line 6, the syntax for CommandScript includes the attribute "executionOrder". The executionOrder attribute is of a string type (line 7) and includes the enumeration values of "sequential" (line 8) and "parallel" (line 9). The enumeration value of sequential indicates a group of commands including the sequential tag will be executed sequentially. The enumeration value of parallel indicates the group of commands including the parallel tag will be executed in parallel. Basically, commands in a group that should be executed sequentially include a sequential tag and commands in a group that can be executed in parallel include a parallel tag.

A sequential tag is used when the execution order of the commands in the group matters (i.e., execution of a command in a group depends on the execution of prior commands in the group). For example, if a command changes an element/attribute in a parent node and another command changes an element/attribute in the child of the parent, the two commands must be executed sequentially with the parent node changed before the child. In other words, the command changing elements/attributes on the parent might affect elements/attributes on the child. Thus, the child's element/attribute should be changed after the parent's to maintain a proper execution cycle between the parent and child. Referring to the content description structure 50 of FIG. 1, node B is considered the parent of nodes D and E. Therefore, a command to change node B should be executed before commands to change nodes D and E. Another example is when a parent node and children nodes are added to the content structure. The parent node must be created before the children and therefore, the command to add a parent node is executed before any commands to add children nodes.

Conversely, commands in a group may be executed in parallel (using a parallel tag) when the execution of the commands in the group do not depend on each other. For example, if two commands change elements/attributes in sibling nodes, the commands may be executed in parallel because they are not dependent on each other. Referring to the content structure 50 of FIG. 1, nodes D and E are considered sibling nodes and commands on both nodes may be executed in parallel because changes to one node will not affect the other node. Thus, the use parallel and sequential tags allow a system to control the order of execution.

On line 12 of FIG. 2, an authority attribute is shown. The authority attribute indicates an authority level to execute a command. This attribute provides a means to control execution of commands. Authority levels, varying from a low authority to high authority, may be assigned to various groups of commands or commands in a group of commands. The authority level is then used to determine when commands are executed. For example, commands with a low authority are typically executed after commands with a high authority. Additionally, for example, the decoder may ignore executing commands from a low level of authority in favor of executing commands from a high level of authority.

On lines 13–16 of FIG. 2, result and write directive attributes are shown. The resultXML and resultXSD attributes indicate whether results of the changes made due to the update CommandDSs should be stored in a separate file or reflected back in the original schema and/or instant documents. Line 14 shows an attribute for writing a .xml file in the case of an instant document update. Line 16 show an attribute for writing a .xsd file in the case of a schema update. The writeXSD (line 13) and writeXML(line 15) attributes specify the location where to save the results of schema and/or instant document updates.

The schema for SyncCommandDS according to one embodiment is also shown in FIG. 3 on lines 12–14. SyncCommandDS is an extension of CommandDS and includes the schema of CommandDS (lines 1–10) along with a SyncCommandDS extension (lines 12–14). In one embodiment, CommandDS is described in "Command Description Scheme Providing For Dynamic Update of Instance Documents and Their Associated Schema", Ser. No. 09/865,030, filed May 24, 2001. Lines 1–10 represent the CommandDS schema and lines 12–13 represent the SyncCommandDS schema. SyncCommandDS adds execution timing aspects. For example, a start time attribute will specify the time for executing a group of commands. Additionally, an optional duration time attribute specifies a time window (beginning with start time and ending with start time+duration time) during which a system (e.g., decoder) may execute the group of commands. This gives flexibility to the decoder in scheduling the command executions as a function of computational load. Thus, a command may be validly executed at the time specified by the start time. However, if the command cannot be executed at the start time, the duration time specifies a window or time period of validity after the start time the command may be executed (start time, start time+duration time). The duration time may be a period of execution validity or may point to a specific time beyond which validity of command execution (s) ends. In a specific embodiment, if a system's controller or more specifically, decoder cannot execute a command at the time specified by the start time, the system's decoder may schedule the command execution during the window of time given by the duration time according to the computational load. Therefore, using the start time and duration time attributes, a system may control the execution time and persistency of executing a set of commands.

A method according to one embodiment will now be described as a series of steps S1, S2, etc. In step S1, a first system (e.g. encoder) sends one or more groups of commands. Each group of commands includes a parallel or sequential tag. Additionally, each group of commands may include the authority, result, and write attributes. In step S2, the groups of commands are received by the second system (e.g. decoder). In step S3, if SyncCommandDS is used, the start time and optional duration time attributes are read at this time (S4).

In step S5, the commands within the group are then sent to a controller, which executes the group of commands according to the attributes. The controller determines the order, execution time, and persistency of commands in the set.

If a start time attribute was included in the tag, the controller attempts to execute the commands beginning at the start time. As discussed above, a group of commands having a sequential tag will be executed sequentially and a group of commands containing a parallel tag will be executed in parallel.

If the group of commands cannot be executed at the start time, the controller will use the duration time attribute, if available, to schedule the execution of commands between the start time and start time+duration time according to the available decoder resources. If a duration time attribute was not included, the controller has to schedule the execution of commands at the start time.

If the group of commands includes an authority attribute, the controller may skip execution of the group of commands if the authority level is low. However, the controller may execute or push up the execution time if the authority level is high.

If the group of commands includes a result and write attribute, the controller may write the results of the execution of the group of commands to a new file or overwrite the existing file. If the results are written to a new file, the results are written to a file designated by the write attribute.

In one example, a set of commands 20 includes a command to change node B ("command B"), commands D and E to change nodes D and E; and command I to add a new node I under node D of FIG. 1. As shown, node B is the parent node of children nodes D and E. Command B forms the first group of commands to be executed first. The second group of commands includes commands D and E to be executed in parallel. Finally, the third group of commands includes command I. If "SyncCommandDS" is used instead of "CommandDS" in the CommandScript DS, then start time and duration time attributes will specify the execution time, persistency and validity of the commands.

The above description is illustrated but not restrictive. Many variations of the invention will become apparent to those skilled in the art upon review of this disclosure. The scope of the invention should, therefore, be determined not with reference to the above description, but instead should be determined with reference to the pending claims along with their full scope or equivalents.

What is claimed is:

1. A computer implemented method for executing a group of commands on a content description structure, the content description structure including a plurality of relationally related nodes, in a computing environment comprising the:
    determining a dependency between commands in the group of commands based on the relationally related plurality of nodes, wherein at least one node is a description that defines semantics and syntax for representing a particular feature of content described by the content description structure;
    assigning one or more attribute tags to the group of commands, wherein assigning one or more attribute tags comprises if commands in the group of commands are determined to be dependent, assigning a sequential tag to the group of commands and if commands in the group of commands are determined to be independent, assigning a parallel tag to the group of commands;
    executing the group of commands according to the one or more attribute tags, wherein executing the group of commands comprises if the group of commands was assigned the sequential tag, executing commands in the group of commands in sequence and if the group of commands was assigned the parallel tag, executing commands in the group of commands in parallel.

2. The method of claim 1, wherein assigning one or more attribute tags to the group of commands comprises assigning a start time tag to the group of commands.

3. The method of claim 2, wherein executing the group of commands according to the one or more attribute tags comprises executing the group of commands at the start time.

4. The method of claim 2, wherein assigning one or more attribute tags to the group of commands comprises assigning a duration time to the group of commands.

5. The method of claim 4, wherein executing the group of commands according to the one or more attribute tags comprises executing the group of commands during a time period starting at the start time and lasting until the start time plus the duration time.

6. The method of claim 1, wherein assigning one or more attribute tags to the group of commands comprises assigning an authority tag to the group of commands.

7. The method of claim 6, wherein executing the group of commands according to the one or more attribute tags comprises skipping execution of the group of commands if the authority level is low.

8. The method of claim 6, wherein executing the group of commands according to the one or more attribute tags comprises executing the group of commands if the authority level is high.

9. The method of claim 1, wherein assigning one or more attribute tags to the group of commands comprises assigning a result tag to a group of commands.

10. The method of claim 9, further comprising saving a result of the execution of the group of commands in a new file.

11. The method of claim 10, wherein assigning one or more attribute tags to the group of commands comprises assigning a write tag to a group of commands, wherein the write tag designates the new file.

12. The method of claim 9, further comprising overwriting an existing file with a result of the execution of the group of commands.

13. The method of claim 1, wherein executing the group of commands comprises executing adding, editing, and deleting commands on the content description structure.

14. A system for executing commands in a computing environment comprising:
    a content description structure, wherein the content description structure includes a plurality of relationally related nodes and at least one node is a description that defines semantics and syntax for representing a particular feature of content described by the content description structure;
    a group of commands, wherein commands in the group of commands have a dependency based on the relationally related nodes;
    one or more attribute tags, wherein the one or more attribute tags comprise a sequential tag and parallel tag;
    an encoder system comprising logic to encode a group of commands in the one or more groups of commands with the one or more attribute tags, wherein the group of commands is encoded with the sequential tag if the dependency of the group of commands is dependent indicating the group of commands are to be executed in sequence and the group of commands is encoded with the parallel tag if the dependency of the group of commands is independent and indicates the group of commands are to be executed in parallel; and
    a decoder system comprising logic to execute the encoded group of commands according to the one or more attribute tags, wherein the group of commands encoded with the sequential tag are executed in sequence and the group of commands encoded with the parallel tag are executed in parallel.

15. The system of claim 14, wherein the one or more attribute tags comprise a start time tag, wherein the start time tag comprises a start time value.

16. The system of claim 15, wherein the encoder system encodes the group of commands with the start time tag, wherein the decoder system executes the group of commands at the start time value.

17. The system of claim 16, wherein the one or more attribute tags comprise a duration tag, wherein the duration tag comprises duration value.

18. The system of claim 17, wherein the encoder system encodes the group of commands with the duration tag, wherein the decoder system executes the group of commands during a time period defined by the start time value and the start time value plus the duration value.

19. The system of claim 14, wherein the one or more attribute tags comprise an authority level tag, wherein the authority level tag comprises an authority level value.

20. The system of claim 19, wherein the encoder system encodes the group of commands with the authority level tag.

21. The system of claim 20, wherein the decoder system does not execute the group of commands if the authority level value is low.

22. The system of claim 20, wherein the decoder system executes the group of commands if the authority level is high.

23. The system of claim 14, wherein the one or more attribute tags comprise a result tag, wherein the result tag comprises a new file value and overwrite value.

24. The system of claim 23, wherein the encoder system encodes the group of commands with the result tag.

25. The system of claim 24, wherein the decoder system saves a result of the executed group of commands in a new file if the result tag has the new file value.

26. The system of claim 25, wherein the new file is a .xml file.

27. The system of claim 25, wherein the new file is a .xsd file.

28. The system of claim 24, wherein the decoder system overwrites an existing file with a result of the executed group of commands if the result tag has the overwrite value.

29. The system of claim 14, wherein the content description structure is a tree structure.

30. The system of claim 14, wherein the relationally related nodes comprise parent and children nodes.

31. A system comprising:
a content description structure, wherein the content description structure includes a plurality of relationally related nodes and at least one node is a description that defines semantics and syntax for representing a particular feature of content described by the content description structure;
a group of commands, wherein commands in the group of commands have a dependency based on the relationally related nodes;
one or more attribute tags, wherein the one or more attribute tags comprise a sequential tag and parallel tag; and
an encoder system comprising logic to encode a group of commands in the one or more groups of commands with the one or more attribute tags, wherein the group of commands is encoded with the sequential tag if the dependency of the group of commands is dependent indicating the group of commands are to be executed in sequence and the group of commands is encoded with the parallel tag if the dependency of the group of commands is independent and indicates the group of commands are to be executed in parallel.

32. The system of claim 31, wherein the one or more attribute tags comprise a start time tag, wherein the start time tag comprises a start time value.

33. The system of claim 32, wherein the one or more attribute tags comprise a duration tag, wherein the duration tag comprises a duration value.

34. The system of claim 31, wherein the one or more attribute tags comprise an authority level tag, wherein the authority level tag comprises an authority level value.

35. The system of claim 31, wherein the one or more attribute tags comprise a result tag, wherein the result tag comprises at least one of a new file value and an overwrite value.

36. A system comprising:
a content description structure, wherein the content description structure includes a plurality of relationally related nodes and at least one node is a description that defines semantics and syntax for representing a particular feature of content described by the content description structure;
a group of commands, wherein commands in the group of commands have a dependency based on the relationally related nodes;
one or more attribute tags, wherein the one or more attribute tags comprise a sequential tag and parallel tag; and
a decoder system comprising logic to execute an encoded group of commands according to the one or more attribute tags, wherein a group of commands encoded with the sequential tag are executed in sequence and a group of commands encoded with the parallel tag are executed in parallel.

37. The system of claim 36, wherein the one or more attribute tags comprise a start time tag, and the decoder system executes a group of commands encoded with the start time tag at the start time value.

38. The system of claim 37, wherein the one or more attribute tags comprise a duration tag, wherein the duration tag comprises a duration value, and the decoder system executes a group of commands encoded with the duration tag during a time period defined by the start time value and the start time value plus the duration value.

39. The system of claim 36, wherein the one or more attribute tags comprise an authority level tag, wherein the authority level tag comprises an authority level value, and the decoder system executes a group of commands encoded with the authority level tag according to the authority level value.

40. The system of claim 36, wherein the one or more attribute tags comprise a result tag, wherein the result tag comprises a new file value, and the decoder system saves a result of executing a group of commands encoded with the result tag in a new file specified by the new file value.

41. The system of claim 36, wherein the one or more attribute tags comprise a result tag, wherein the result tag comprises an overwrite value, and the decoder system overwrites an existing file with a result of executing a group of commands encoded with the result tag.

42. An apparatus comprising:
a content description structure, wherein the content description structure includes a plurality of relationally related nodes and at least one node is a description that defines semantics and syntax for representing a particular feature of content described by the content description structure;
a group of commands, wherein commands in the group of commands have a dependency based on the relationally related nodes;
one or more attribute tags, wherein the one or more attribute tags comprise a sequential tag and parallel tag; and
means for encoding a group of commands in the one or more groups of commands with the one or more attribute tags, wherein the group of commands is encoded with the sequential tag if the dependency of the group of commands is dependent indicating the group of commands are to be executed in sequence and the group of commands is encoded with the parallel tag if the dependency of the group of commands is independent and indicates the group of commands are to be executed in parallel.

43. The apparatus of claim 42 further comprising:
means for decoding the encoded group of commands according to the one or more attribute tags, wherein the group of commands encoded with the sequential tag are executed in sequence and the group of commands encoded with the parallel tag are executed in parallel.

44. An apparatus comprising:
- a content description structure, wherein the content description structure includes a plurality of relationally related nodes and at least one node is a description that defines semantics and syntax for representing a particular feature of content described by the content description structure;
- a group of commands, wherein commands in the group of commands have a dependency based on the relationally related nodes;
- one or more attribute tags, wherein the one or more attribute tags comprise a sequential tag and parallel tag; and
- means for decoding an encoded group of commands according to the one or more attribute tags, wherein a group of commands encoded with the sequential tag are executed in sequence and a group of commands encoded with the parallel tag are executed in parallel.

* * * * *